(12) United States Patent
Yanagihara

(10) Patent No.: US 9,288,837 B2
(45) Date of Patent: Mar. 15, 2016

(54) WIRELESS DEVICE AND WIRELESS SYSTEM

(75) Inventor: Kentarou Yanagihara, Hyogo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 919 days.

(21) Appl. No.: 12/801,004

(22) Filed: May 17, 2010

(65) Prior Publication Data
US 2011/0053493 A1   Mar. 3, 2011

(30) Foreign Application Priority Data

Aug. 25, 2009   (JP) ................. 2009-194608

(51) Int. Cl.
*H04B 3/36* (2006.01)
*H04B 7/14* (2006.01)
(Continued)

(52) U.S. Cl.
CPC .......... *H04W 84/20* (2013.01); *H04W 52/0225* (2013.01)

(58) Field of Classification Search
CPC ..... H04W 84/18; H04W 88/04; H04W 40/08; H04W 52/0274; H04W 52/288; H04W 52/46; H04W 56/00; H04W 74/00; H04W 74/04; H04W 76/043; H04W 24/00; H04W 24/02; H04W 28/06; H04W 52/0216; H04W 52/0219; H04W 52/0277; H04W 52/028; H04W 52/20; H04W 72/1215; H04W 76/048; H04W 84/08; H04W 84/20; H04W 52/02; H04W 88/06; H04W 88/08; H04L 2001/0097; H04L 1/0015; H04L 45/123; H04L 45/308; H04L 67/04; H04L 67/14; H04L 45/12; H04B 7/0413; H04B 7/022; H04B 7/026; H04B 7/15557; H01M 1/7253; G08B 13/1427; G08B 21/0277
USPC ............ 455/7, 9, 11.1, 13.1, 13.2, 13.4, 41.1, 455/41.2, 343.1, 420, 456.1, 517, 574, 575, 455/500; 370/209, 254, 278, 310, 328, 345, 370/351, 449, 452, 509
See application file for complete search history.

(56) References Cited

U.S. PATENT DOCUMENTS 6,973,335 B2 * 12/2005  Ganton ................. 455/573
7,593,376 B2 *  9/2009  D'Amico et al. ......... 370/338
(Continued)

FOREIGN PATENT DOCUMENTS

| JP | 2005-523666 A | 8/2005 |
| JP | 2008-092196 A | 4/2008 |
| JP | 2009-055301 A | 3/2009 |

OTHER PUBLICATIONS

Japanese Office Action dated May 7, 2013 with partial English translation.

*Primary Examiner* — Yuwen Pan
*Assistant Examiner* — Paul P Tran
(74) *Attorney, Agent, or Firm* — Rabin & Berdo, P.C.

(57) ABSTRACT

A wireless device operates in a first mode, in which it relays communications between neighboring wireless devices, and a second mode, in which it does not relay communications. The wireless device periodically transmits information indicating its operating mode to the neighboring wireless devices. In the first mode, when not transmitting mode information or communication data, the wireless device stands by with its receiver powered, ready to receive mode information or communication data from neighboring wireless devices. In the second mode, the wireless device is normally in a sleep state and wakes up only at scheduled intervals to transmit and receive mode information and communication data. The wireless device stores the received mode information and selects its operating mode according to the stored mode information, selecting the second mode when this does not prevent the prevent communication with or among the neighboring wireless devices.

16 Claims, 10 Drawing Sheets

(51) Int. Cl.

| | |
|---|---|
| *H04B 7/15* | (2006.01) |
| *H04B 7/185* | (2006.01) |
| *H04B 5/00* | (2006.01) |
| *H04W 24/00* | (2009.01) |
| *H04Q 5/22* | (2006.01) |
| *G08B 1/08* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 4/00* | (2009.01) |
| *H04L 12/66* | (2006.01) |
| *H04W 84/20* | (2009.01) |
| *H04W 52/02* | (2009.01) |

(56) References Cited

U.S. PATENT DOCUMENTS

| | | | |
|---|---|---|---|
| 7,865,183 B2 * | 1/2011 | Salokannel et al. | 455/426.1 |
| 7,953,365 B2 * | 5/2011 | Lim et al. | 455/11.1 |
| 8,045,497 B2 * | 10/2011 | Kim et al. | 370/315 |
| 8,320,288 B2 * | 11/2012 | Sakoda | 370/311 |
| 8,335,548 B2 * | 12/2012 | Kuwana | H04W 84/20 455/127.1 |
| 2002/0168943 A1 * | 11/2002 | Callaway, Jr. | H04B 17/318 455/67.11 |
| 2003/0087681 A1 * | 5/2003 | Sackett | H04W 52/0229 455/574 |
| 2003/0195019 A1 * | 10/2003 | Litwin | 455/574 |
| 2007/0019573 A1 * | 1/2007 | Nishimura | 370/279 |

* cited by examiner

FIG.4

| NEIGHBORING WIRELESS DEVICES | OPERATING MODE | TWO-HOP NODES |
|---|---|---|
| 102 | M | 101, 103, 106, 107, 108 |
| 103 | S | 102, 104, 107, 108, 109 |
| ... | ... | ... |

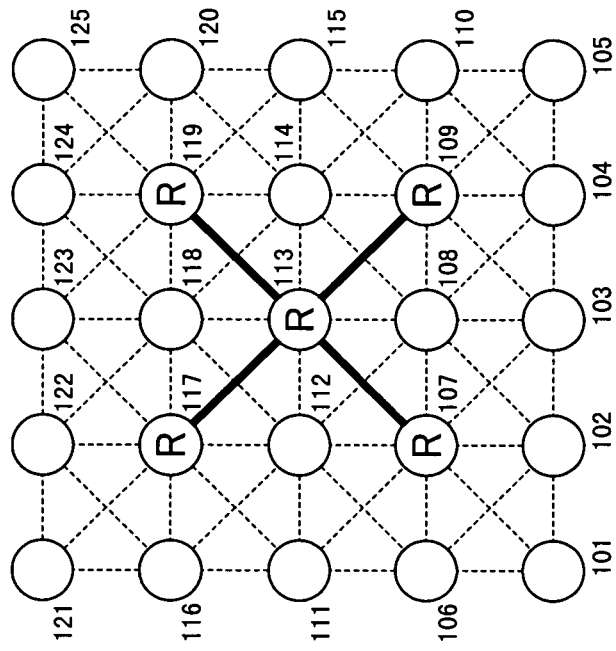
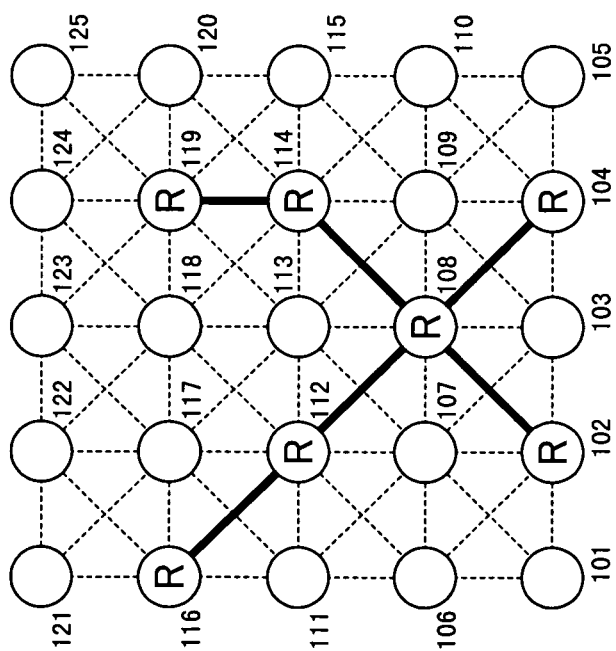
*FIG.5A*
*FIG.5B*

FIG.9

| NEIGHBORING WIRELESS DEVICES | OPERATING MODES | TWO-HOP NODES |
|---|---|---|
| 102 | M | 101, 103, 106, 107, 108 |
| 103 | S | 102, 104, 107, 108, 109 |
| 104 | M | 103, 105, 108, 109, 110 |
| 107 | S | 101, 102, 103, 106, 108,111,112,113 |
| 109 | S | 103, 104, 105, 108, 110,113,114,115 |
| 112 | M | 106, 107, 108, 111, 113,116,117,118 |
| 113 | S | 107, 108, 109, 112, 114,117,118,119 |
| 114 | M | 108, 109, 110, 113, 115,118,119,120 |

FIG.10

| NEIGHBORING WIRELESS DEVICES | OPERATING MODES | TWO-HOP NODES |
|---|---|---|
| 102 | M | 101, 103, 106, 107, 108 |
| 104 | M | 103, 105, 108, 109, 110 |
| 107 | S | 101, 102, 103, 106, 108,111,112,113 |
| 108 | M | 102, 103, 104, 107, 109,112,113,114 |
| 109 | S | 103, 104, 105, 108, 110,113,114,115 |

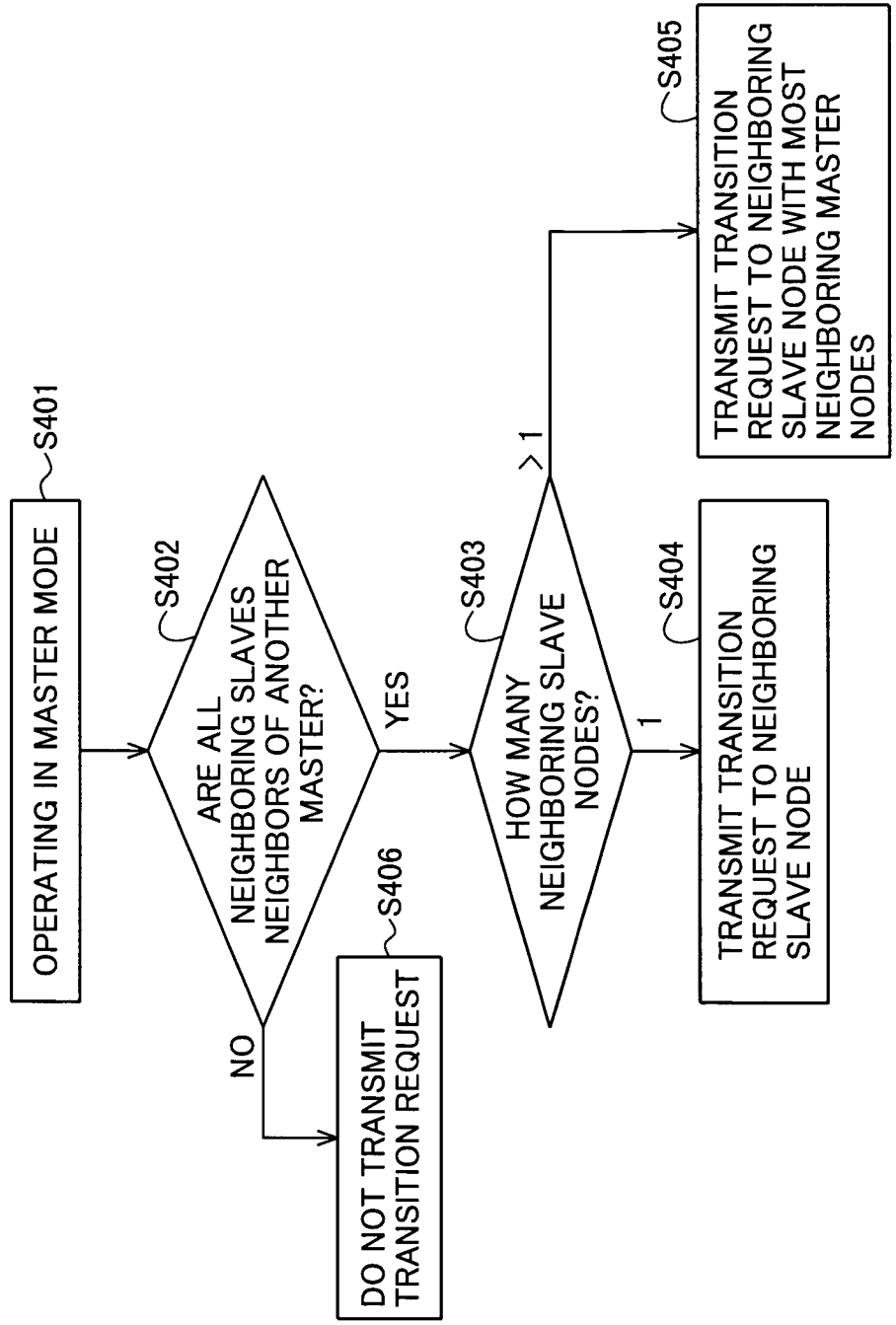

WIRELESS DEVICE AND WIRELESS SYSTEM

BACKGROUND OF THE INVENTION

1. Field of the Invention

The present invention relates to a wireless device and system. The invention is relevant to multi-hop wireless networks such as, for example, sensor networks, and to their component wireless devices.

2. Description of the Related Art

There are various known methods of implementing a network in which wireless devices that cannot communicate directly can nevertheless communicate in multi-hop fashion by relaying packets through a series of intermediate wireless devices. In the most general method, every wireless device is assumed to be ready at all times to communicate with any other wireless device within communication range, so that any wireless device can act as an intermediate relay node between two neighboring wireless devices. New transmission paths can therefore be set up just by routing packets through existing wireless devices, without the cost of additional wiring that would be incurred in a wired network.

A problem with this general method is that since each wireless device must always be ready to receive signals from its neighbors, every wireless device must keep its receiver operating at all times. This increases the power consumption of the wireless devices, which is particularly problematic for battery-powered devices.

Alternative methods have therefore been developed in which some of the wireless devices act as relay nodes while others act only as end nodes, and packets are relayed from one end node to another exclusively through relay nodes. In Japanese Patent Application Publication No. 2009-55301, for example, Noma et al. describe a wireless sensor network system in which each end device communicates with only one relay node, and the end devices conserve power by turning off their receivers except at scheduled times.

This system, however, is still imperfect. One problem is that power consumption is reduced only at the end devices, and not at the devices that act as relay nodes. Another problem is that reliability is sacrificed, because many of the possible communication links in the system are unavailable. For example, an end device cannot replace a failed communication link to a relay node by routing packets through another end device, even if the other end device is within communication range.

SUMMARY OF THE INVENTION

An object of the present invention is therefore to provide a wireless network in which all wireless devices have a relay function, but the relay function is controlled on the basis of communication between the wireless devices so that relay processing is actually performed by only some of the wireless devices.

The invention provides a wireless device that operates in a first mode and a second mode. Relay processing is performed in the first mode but not in the second mode. A power controller performs power control in the wireless device in different ways, depending on whether the wireless device is operating in the first mode or the second mode. Under control of the power controller, the wireless device periodically transmits mode information to neighboring wireless devices, indicating its mode of operation, and receives similar mode information transmitted by neighboring wireless devices, indicating their modes of operation. The received mode information is stored in a mode information storage facility. A mode controller in the wireless device decides which mode the wireless device will operate in, depending at least on the operating modes of the neighboring wireless devices, as indicated by the stored mode information.

When operating in the second mode, the wireless device can conserve power by entering a sleep state except during scheduled transmission and reception periods.

The invention also provides a wireless system or network including wireless devices of the above type.

Since each wireless device in the network can switch between operating in a relay mode and operating in a non-relay mode or end mode in response to changes in the wireless device itself and changes in its neighboring wireless devices, no wireless device needs to operate in the relay mode all the time, enabling power consumption to be reduced at all wireless devices in the network. Since all wireless devices in the network can operate in the relay mode when necessary, however, the number of available communication paths is increased, enabling more reliable communication to be carried out than in networks in which only some of the wireless devices can act as relay devices.

BRIEF DESCRIPTION OF THE DRAWINGS

In the attached drawings:

FIG. 4 shows mode information stored in wireless device 108 in FIG. 1A;

FIGS. 5A and 5B show further examples of the relay node configuration in the network in the embodiment;

FIG. 9 shows mode information stored in wireless device 108 in FIG. 5A;

FIG. 10 shows mode information stored in wireless device 103 in FIG. 5A;

FIG. 12 is a flowchart showing a transition request signal transmission procedure according to the embodiment.

DETAILED DESCRIPTION OF THE INVENTION

Figure 1B:
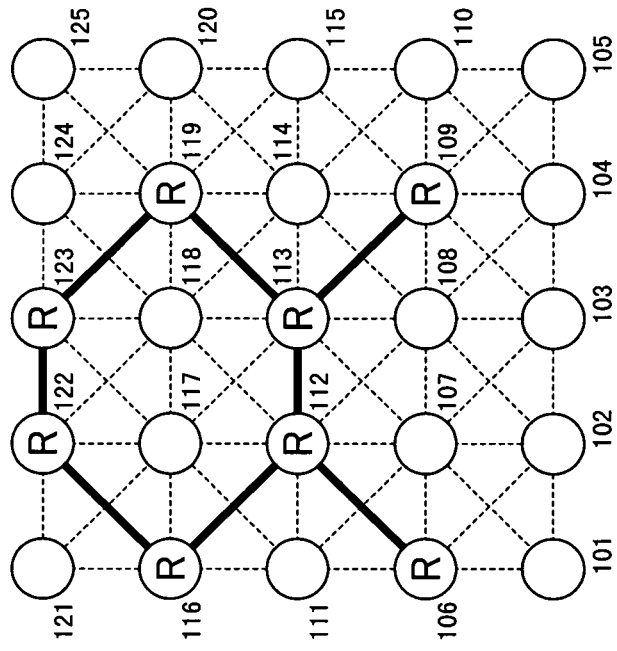
FIGS. 1A and 1B show examples of the relay node configuration in a network embodying the invention.

An embodiment of the invention will now be described with reference to the attached drawings, in which like elements are indicated by like reference characters. Wireless devices operating in the first (relay) mode will also be referred to as master nodes or 'masters'. Wireless devices operating in the second (non-relay) mode will be referred to as slave nodes or 'slaves'.

The terms 'neighbor' and 'neighboring' will be used to refer to wireless devices within direct (one-hop) communication range.

The embodiment illustrates an application of the invention to a multi-hop wireless network such as a sensor network. This embodiment can achieve uniform power consumption across all wireless devices in the network, reduce power consumption in each wireless device, and prevent interruption of communication due to failures in the wireless devices or disconnection of wireless links between the wireless devices.

Figure 1A:
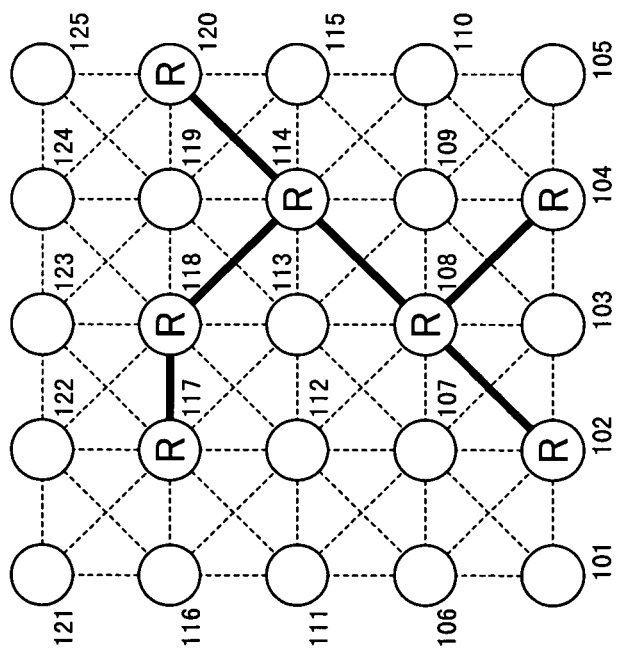

An exemplary node configuration in a wireless network according to the embodiment is shown in FIGS. 1A and 1B. Of the wireless devices 101-125 in the network, those designated by the letter R operate as master nodes by performing relay processing, while the unmarked wireless devices operate as slave nodes. Direct (one-hop) communication links are indicated by dotted lines. Direct communication links between master nodes are indicated by solid bold lines.

FIG. 1B shows the network in FIG. 1A after a change has occurred in the master node configuration. In both FIGS. 1A and 1B, every slave node can directly communicate with at least one master node, and any pair of wireless devices can communicate with each other, either directly or through one or more master nodes. Furthermore, no wireless device operates as a master node in both FIGS. 1A and 1B. When the invention is practiced, ideally, no wireless device operates as a master node at all times, enabling the power consumption in every wireless device to be reduced.

Figure 2:
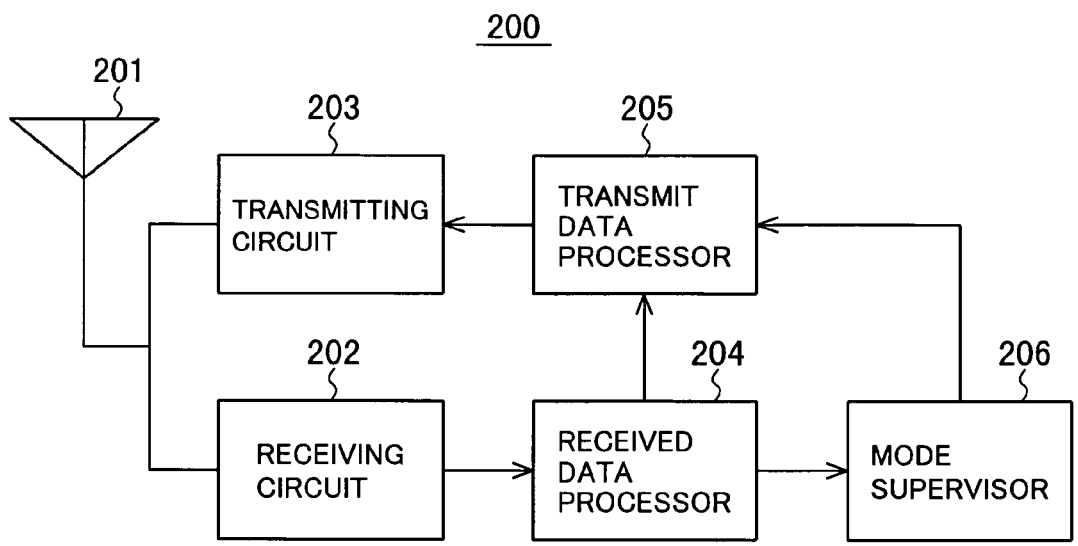
FIG. 2 shows the internal configuration of a wireless device in the embodiment.

FIG. 2 shows the internal configuration of the wireless devices 101-125. All the wireless devices 101-125 have the same internal configuration, so a representative wireless device is denoted by reference numeral 200.

The wireless device 200 in FIG. 2 includes at least an antenna 201, a receiving circuit 202, a transmitting circuit 203, a received data processor 204, a transmit data processor 205, and a mode supervisor 206.

The antenna 201 receives radio signals and supplies them to the receiving circuit 202. It also transmits radio signals received from the transmitting circuit 203.

The receiving circuit 202 demodulates the radio signals received from the antenna 201, converting them into digital information. The digital information is supplied to the received data processor 204 as received data.

The transmitting circuit 203 converts data generated by the transmit data processor 205 to radio signals and supplies these signals to the antenna 201.

The received data processor 204 applies predetermined processing to the received data obtained from the receiving circuit 202, thereby generating data required by the mode supervisor 206. If the data are addressed to the wireless device itself, the received data processor 204 also carries out data reception processing. If the data are addressed to another wireless device, the received data processor 204 uses information obtained from the mode supervisor 206 to determine the node to which the data should be relayed next and supplies this destination information, together with the data, to the transmit data processor 205.

Using information about neighboring wireless devices obtained from the mode supervisor 206, the transmit data processor 205 generates transmit data to be transmitted to the neighboring wireless devices. Using data received from the received data processor 204, the transmit data processor 205 also generates relay data to be transmitted to the neighboring wireless devices. The transmit data and relay data are supplied to the transmitting circuit 203.

The transmit data processor 205 also receives mode information from the mode supervisor 206, indicating whether the wireless device itself is operating as a master node or a slave node, and generates transmit data including this mode information and preferably other node information as described below. A signal conveying this type of transmit data, including mode information, will be referred to below as a notification signal. Notification signals are broadcast periodically, in scheduled transmission periods, to all wireless devices within one-hop communication range.

The mode supervisor 206 receives data from the received data processor 204, stores mode information about neighboring wireless devices, and stores further information required to determine the operating mode of the wireless device itself. From the stored information, the mode supervisor 206 decides whether to have the wireless device operate as a master node or as a slave node, provides the transmit data processor 205 with mode information indicating the selected operating mode, and performs power control of the receiving and transmitting circuits 202, 203.

Figure 3:
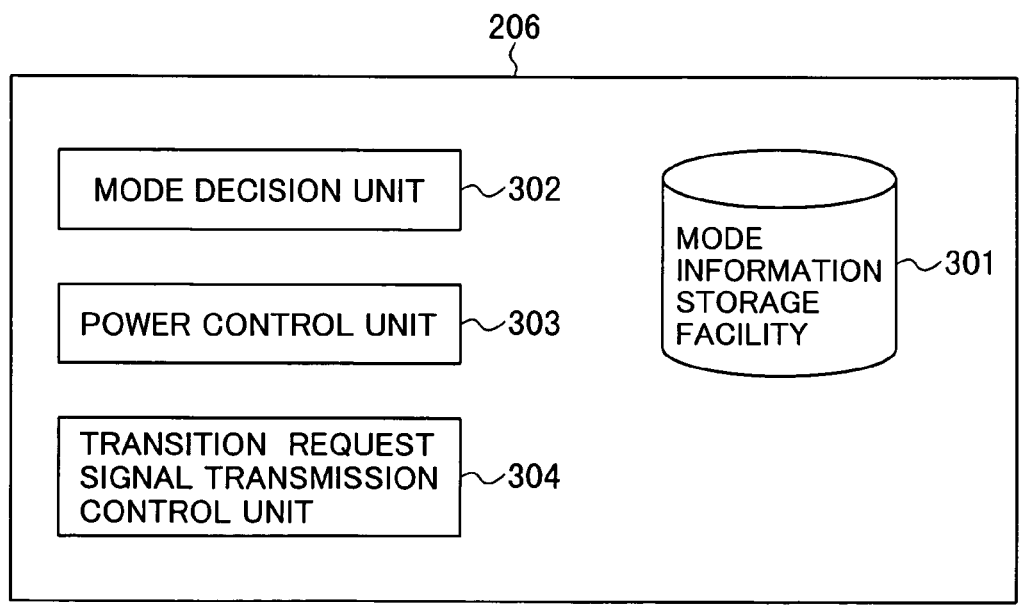
FIG. 3 shows the functional configuration of the mode supervisor in FIG. 2.

FIG. 3 shows the internal configuration of the mode supervisor 206. The mode supervisor 206 in FIG. 3 includes at least a mode information storage facility 301, a mode decision unit 302, a power control unit 303, and a mode transition request signal transmission control unit 304.

The mode information storage facility 301 stores mode information about other wireless devices, obtained from notification signals received from the neighboring wireless devices. In this embodiment, the mode information storage facility 301 is configured to store identification and mode information about neighboring nodes, i.e., nodes within one-hop communication range, and similar information about two-hop nodes, which are neighbors of a neighboring node.

FIG. 4 illustrates the mode information stored in the mode information storage facility 301 by showing a portion of the information stored in the mode information storage facility 301 in wireless device 108 in FIG. 1A.

The 'neighboring wireless devices' column in FIG. 4 lists the identifiers of neighboring nodes. For example, the identifier '102' in the first row in this indicates that wireless device 102 is a neighbor of wireless device 108. This means that wireless device 108 has received a notification signal from wireless device 102.

The 'operating mode' column indicates whether each neighboring wireless device is operating as a master (M) or slave (S). This mode information is obtained from the notification signals received from the neighboring wireless devices.

The 'two-hop nodes' column lists the wireless devices neighboring each neighboring node. For example, the entry in the first row in this column in FIG. 4 indicates that wireless devices 101, 103, 106, 107, and 108 are neighbors of wireless device 102. Bold characters are used to indicate master nodes in the two-hop column. Two-hop nodes may also be neighboring nodes appearing in the 'neighboring wireless devices' column, and wireless device 108 itself is listed as a two-hop node of every neighboring node.

The mode information about the two-hop nodes is preferably obtained by having each wireless device include a list of its neighboring nodes and their modes in the notification signals transmitted by the wireless device.

Using the mode information in the mode information storage facility 301, the mode decision unit 302 decides whether to have its own wireless device operate as a master or a slave. The specific decision procedure will be described in detail later.

The power control unit 303 performs power control of the transmitting and receiving circuits in the wireless device. The control procedure depends on the mode in which the wireless device is operating.

When the wireless device is operating as a master, the power control unit 303 powers the transmitting circuit 203 on during periods when transmit data, relay data, notification signals, or other wireless signals are being transmitted, and powers the receiving circuit 202 on at all times except during these transmission periods. When powered on, the receiving circuit 202 is either actively receiving signals or standing by, ready to receive signals.

When the wireless device is operating as a slave, the power control unit 303 powers the transmitting circuit 203 on during scheduled transmission periods when transmit data or notification signals are being transmitted, powers the receiving circuit 202 on during scheduled reception periods to receive signals that may be transmitted from neighboring wireless devices, and places the wireless device in a sleep mode at all other times.

When the wireless device is operating as a master, the mode transition request signal transmission control unit 304 may transmit a transition request signal to a neighboring wireless device operating as a slave node, asking the neighboring wireless device to switch over to master node.

The communication procedure followed by the wireless devices in the embodiment will now be described.

The embodiment allows a network to be configured in any way that provides enough master nodes so that any pair of wireless devices can communicate with each other. Although no wireless device operates as a master node at all times in FIGS. 1A and 1B, this is not a necessary condition. For example, if the network includes a wireless device powered by a commercial power source or a wireless device capable of being connected to an external network, it may be preferable for that wireless device to operate as a master node at all times.

The following description will be based on the exemplary configuration of master nodes shown in FIGS. 5A and 5B. The wireless devices 101-125 are the same as in FIGS. 1A and 1B, but wireless device 119 operates as a master node in both FIGS. 5A and 5B. Reference numeral 200 will again be used to refer to an arbitrary one of the wireless devices 101-125.

Figure 6:
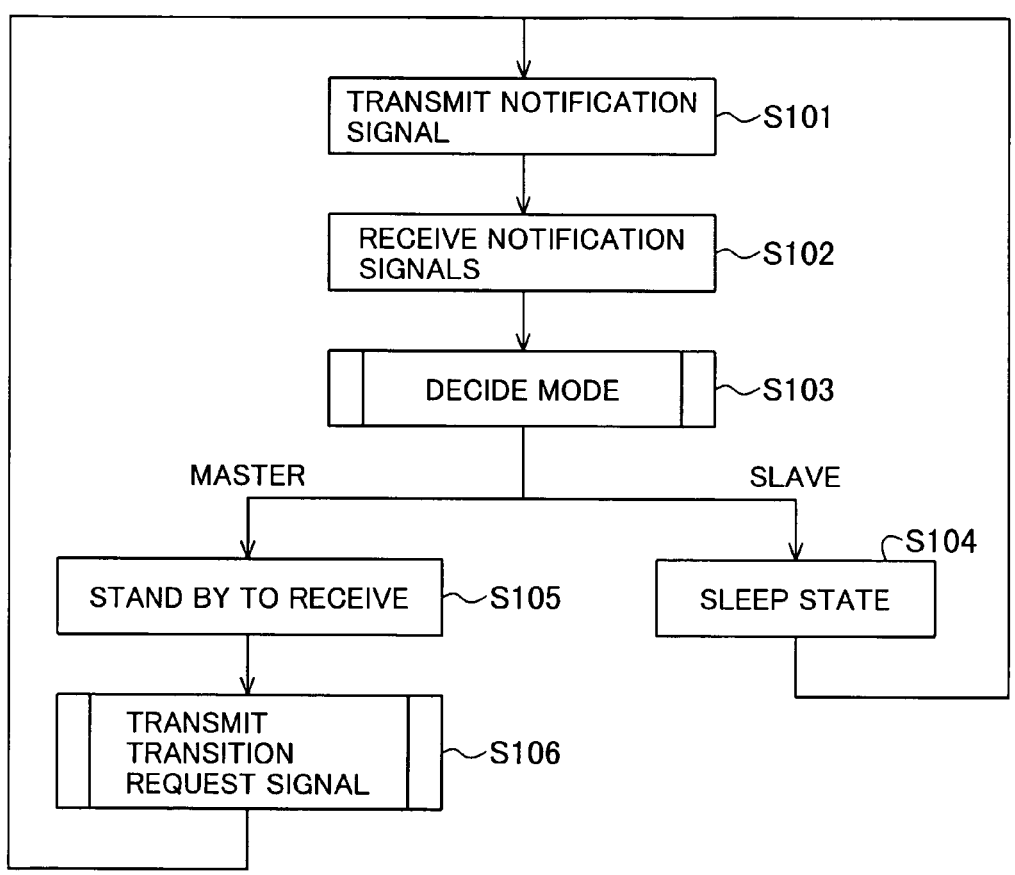
FIG. 6 is a flowchart showing a network configuration procedure in the wireless device according to the embodiment.

Referring to the flowchart in FIG. 6, at periodic intervals wireless device 200 transmits a notification signal including its own identification and mode information and similar information pertaining to its neighboring wireless devices (step S101). The notification signal is generated by the transmit data processor 205 on the basis of information supplied by the mode supervisor 206 as described above, and is transmitted by the transmitting circuit 203 from the antenna 201. The notification signal is not addressed to any specific node; it is broadcast to all neighboring wireless devices, intended for reception by any node within communication range.

After transmitting a notification signal, the wireless device 200 powers off its transmitting circuit 203 and powers on its receiving circuit 202 to receive signals that may be transmitted from neighboring wireless devices (step S102). Even if the wireless device 200 is currently operating as a slave node, its receiving circuit 202 is left powered on for a predetermined reception period, regardless of whether any signals are actually received. If a notification signal is received from a neighboring wireless device during the reception period, the received data processor 204 transfers the information in the notification signal to the mode supervisor 206. The mode supervisor 206 uses the information in the notification signal to update the identification and mode information about neighboring nodes and two-hop nodes in the mode information storage facility 301.

At the end of the reception period, based on the mode information stored in the mode information storage facility 301, the mode decision unit 302 decides whether to have the wireless device operate as a master or a slave (step S103). The specific mode control procedure will be described below.

If the mode decision unit 302 decides to have the wireless device operate as a slave node, since the wireless device will not perform relay processing, the mode decision unit 302 turns off the receiving circuit 202 and places the wireless device in the sleep state (step S104). The wireless device 200 remains in the sleep state for a predetermined sleep interval, until it is time to transmit another notification signal, at which point the transmitting circuit 203 is turned on and the procedure returns to step S101.

If the mode decision unit 302 decides to have the wireless device operate as a master node in step S103, then to enable the wireless devices to perform relay processing, the mode decision unit 302 leaves the receiving circuit 202 powered on continuously, except during the transmission of notification signals and data, and stands by to receive any signals that might arrive (step S105).

If, while operating as a master node, the wireless device 200 receives data to be relayed to another master node, the received data processor 204 passes the data to the transmit data processor 205 and the transmitting circuit 203 transmits the data from the antenna 201. After this transmission period, the wireless device 200 returns to the standby state indicated in step S205.

If, while operating as a master node, the wireless device 200 receives data to be relayed to a slave node, the transmit data processor 205 prepares the data, waits until a notification signal is received from the slave node, and then has the transmitting circuit 203 transmit the data. The destination slave node accordingly receives the data during its reception period, before reverting to the sleep state.

If at any time the wireless device 200 generates data of its own to be transmitted to a neighboring node, it transmits the data in the same way, transmitting immediately to a master node but waiting to receive a notification signal from a slave node before transmitting to the slave node.

Figure 7:
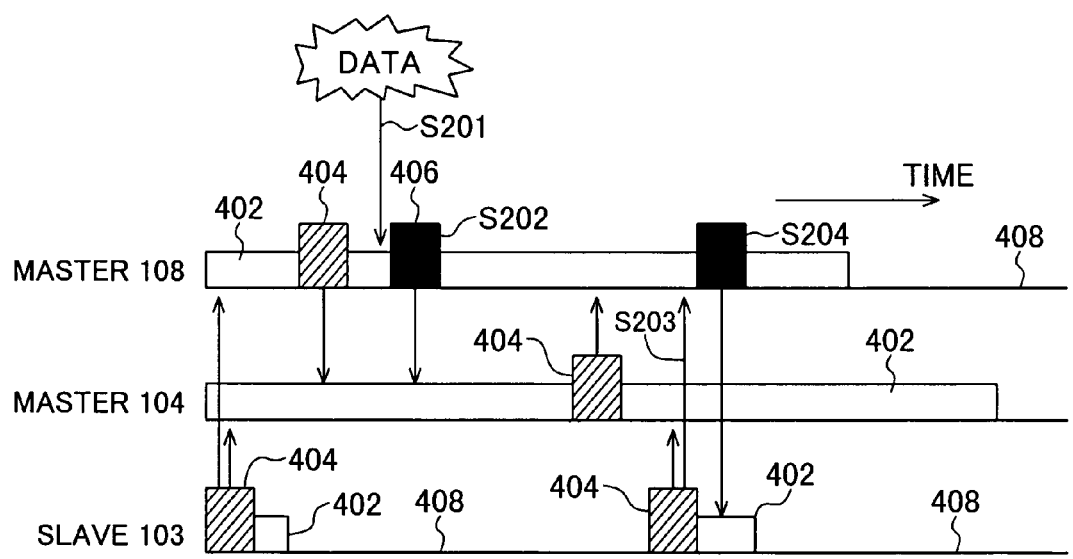
FIG. 7 illustrates transmission and reception timing in the embodiment.

The transmission of data is illustrated in FIG. 7, in which reception and standby periods 402 are indicated by white bars or rectangles, notification signal transmission periods 404 are indicated by diagonal hatching, data transmission periods 406 are indicated by dark rectangles, and sleep periods 408 are indicated by thin horizontal lines. The operation of one slave node 103 and two master nodes 104, 108 in FIG. 5A is illustrated. These three nodes 103, 104, 108 are mutual neighbors, and a wireless link has been established between the two master nodes 104, 108.

Of the notification signals transmitted in the notification signal transmission periods 404, the signals transmitted by the slave node 103 are received by both master nodes 104, 108, and the notification signals transmitted by each master node are received by the other master node, but the notification signals transmitted by the master nodes 104, 108 are not received by the slave node 103, which is asleep.

After transmitting its notification signal, master node 108 receives or generates data that must be transmitted to both nodes 103 and 104 (step S201).

As node 104 is operating in the master mode and is currently in the reception stand-by state, node 108 transmits the data immediately to node 104 (step S202), without waiting for reception of a notification signal from node 104.

As node 103 is operating in the slave mode and is currently in the sleep state 408, however, node 108 waits to receive a notification signal from node 103 (step S203) and then transmits the data to node 103 (step S204). Node 103 receives the data during the reception period 402 following its notification signal transmission period 404, and then goes back to sleep.

Referring back to FIG. 6, while operating as a master node a wireless device may also transmit a transition request signal to a neighboring wireless device operating as a slave node (step S106). A wireless device that has transmitted a transition request signal can then conserve power by switching over to the slave mode, in which it spends most of its time in the sleep state.

The procedure for transmitting a transition request signal is the same as for the transmission of data. Specifically, the transition request signal is transmitted immediately after a notification signal is received from the slave node. The slave node that receives the transition request signal switches over to operate as a master node. Criteria for transmitting the transition request signal will be given below.

Figure 8:
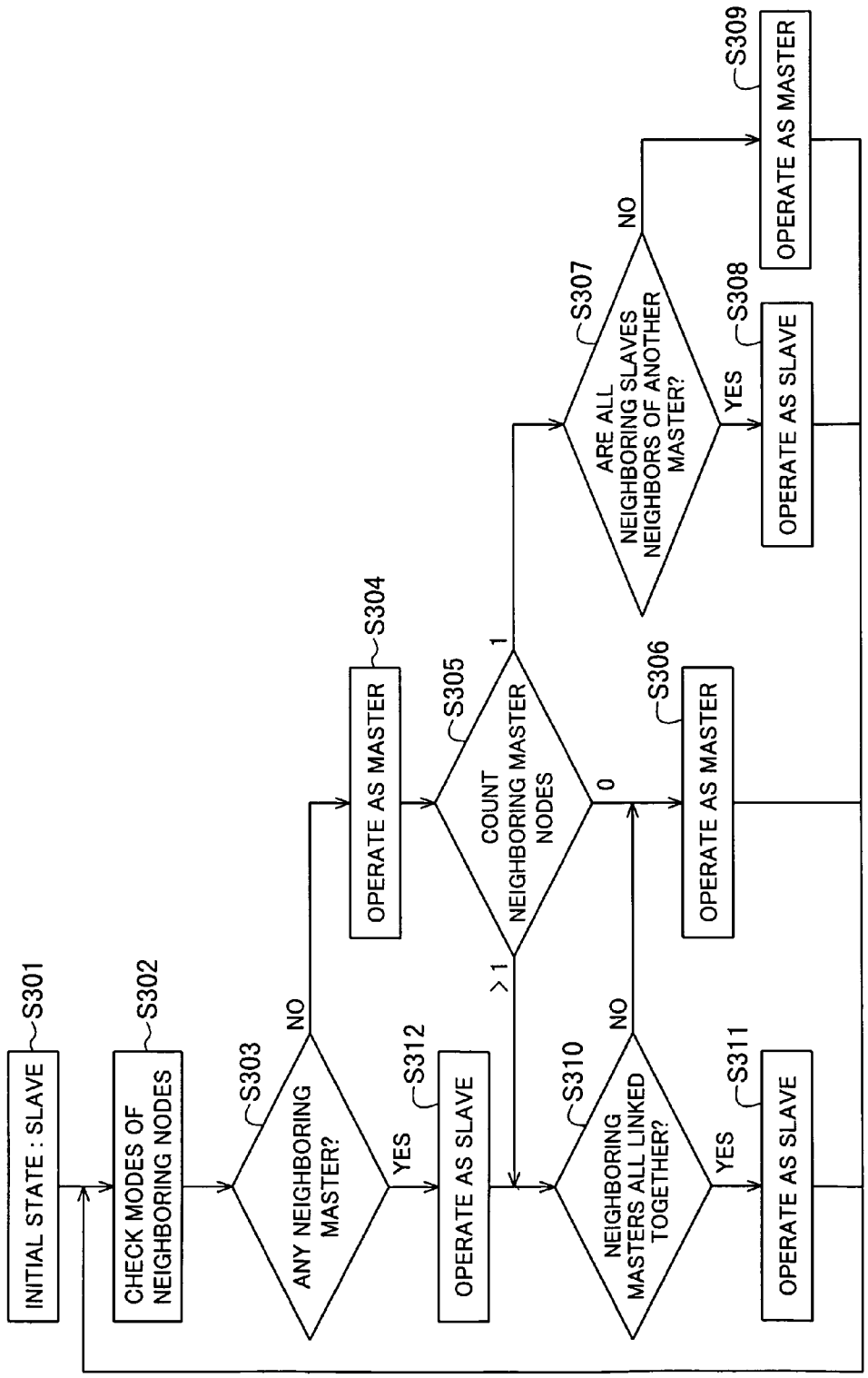
FIG. 8 is a flowchart showing a mode control procedure in the wireless device in the embodiment.

The procedure by which a wireless device 200 decides whether to operate as a master node or as a slave node will now be described with reference to the flowchart in FIG. 8. The procedure in FIG. 8 is followed in whole or in part by each wireless device 200, depending on its current state.

Initially, all the wireless devices 200 operate as slave nodes (step S301).

When a wireless device receives a notification signal from a neighboring wireless device, the mode supervisor 206 in the wireless device stores identification information identifying nearby nodes and indicating their operating modes in the mode information storage facility 301. The mode decision unit 302 then refers to the information stored in the mode information storage facility 301 in order to determine whether to have the wireless device operate as a master node or as a slave node (step S302).

Specifically, the mode decision unit 302 determines whether any known neighboring wireless device is operating as a master node (step S303). If no neighboring wireless device is operating as a master node, the wireless device switches to operate as a master node itself (step S304).

After the wireless device has started to operate as a master node, the mode decision unit 302 rechecks the list of neighboring wireless devices and counts the number of neighboring wireless devices that are operating as master nodes (step S305).

If no neighboring wireless devices are operating as master nodes, the mode decision unit 302 allows the wireless device to continue to operate as a master node (step S306).

If just one neighboring wireless device is operating as a master node, the mode decision unit 302 then determines whether every neighboring wireless device operating as a slave node is a neighbor of a master node other than the wireless device itself (step S307). This can be ascertained from the list of two-hop nodes in the mode information storage facility 301. If all neighboring slave nodes are neighbors of another master node, the mode decision unit 302 causes the wireless device to operate as a slave node (step S308); otherwise, it allows the wireless device to continue to operate as a master node (step S309).

Referring back to step S305, if two or more neighboring wireless devices are operating as master nodes, the mode decision unit 302 refers to the information stored in the mode information storage facility 301 to determine whether these master nodes can all communicate with each other directly or via a master node other than the wireless device itself (step S310). If so, the mode decision unit 302 causes the wireless device to operate as a slave node (step S311); otherwise, the wireless device continues to operate as a master node (step S306).

Referring back to step 303, when the decision is that there is a neighboring master node and the wireless device is allowed to continue to operate as a slave node (step S312), the mode decision unit 302 refers to the information stored in the mode information storage facility 301 to decide whether the neighboring master nodes can all communicate with each other directly or via another master node (step S310). If so, the mode decision unit 302 allows the wireless device to continue to operate as a slave node (step S311); otherwise, the wireless device switches over to operate as a master node (step S306).

A specific example of the mode control procedure will now be described in detail with reference to FIG. 5A. FIG. 9 shows the content of the mode information stored in wireless device 108 shown in FIG. 5A. Wireless device 108 can communicate directly with master nodes 102, 104, 112, and 114, but these master nodes 102, 104, 112, and 114 can communicate with each other only by relay via wireless device 108.

This can be substantially determined from FIG. 9. For example, among the two-hop nodes listed for master nodes 102 and 104, only wireless device 108 is operating as a master node. The two-hop nodes listed for master node 114 include master node 119 as well as wireless device 108, but master node 119 does not appear among the two-hop nodes listed for master nodes 102, 104, and 112. The information in FIG. 9 accordingly indicates that without wireless device 108, the network of master nodes might become disconnected. For this reason, wireless device 108 needs to continue to operate as a master node.

A similar analysis shows that the other master nodes 102, 104, 112, 114, 116, and 119 in FIG. 9 also need to continue to operate as master nodes. For example, wireless device 116 must continue to operate as a master node because it is the only master node neighboring wireless device 121, and wireless device 112 must continue to operate as a master node because it is the only master node neighboring wireless device 116.

FIG. 10 shows the content of the mode information stored in wireless device 103 in FIG. 5A.

It can be seen from the information in FIG. 10 that among the neighboring master nodes 102, 104, and 108 of wireless device 103, wireless device 102 and wireless device 104 can both directly communicate with wireless device 108. Wireless devices 102 and 104 can therefore communicate with each other through wireless device 108, so wireless device 103 does not need to operate as a master node, and may continue to operate as a slave node.

Similar tests performed for all the wireless devices in FIGS. 1A, 1B, 5A, and 5B show that it is not necessary for the master node configuration to be changed in any of these drawings. Accordingly, the network configurations in FIGS. 1A, 1B, 5A, and 5B are stable.

The list of neighboring nodes may be maintained as follows.

If a wireless device is operating as a master node and receives no notification signals from one of its neighboring wireless devices for a predetermined period, that neighboring wireless device is eliminated from the list of neighboring wireless devices.

If a wireless device is operating as a slave node, after transmitting a notification signal, it keeps its receiver operating for a predetermined period (an amount of time equal to or longer than the notification signal transmission period) so as to receive notification signals periodically transmitted from its neighboring wireless devices. Wireless devices from which notification signals are received during the predetermined period are added to the list of neighboring wireless devices for the wireless device.

The stable states shown in FIGS. 1A, 1B, 5A, and 5B may become unstable, leading to a change in the master node configuration, for the following reasons.

First, a configuration change may occur because of a change in the available links among the wireless devices. The loss of any of the master-to-master links denoted by solid lines in FIGS. 1A, 1B, 5A, and 5B would force a configuration change. The loss of one of the links denoted by dotted lines, e.g., the link between nodes 101 and 107 in FIG. 5B, could also force a configuration change. The addition of a previously unavailable link might also lead to a configuration change.

Second, if a wireless device that has been operating as a master node switches to operate as a slave node due to problems such as power consumption, its neighboring wireless devices may be forced to change their operating modes.

Third, a configuration change may occur when a wireless device ceases operation due to a problem such as insufficient battery charge.

Finally, a configuration change may occur when a new wireless device joins the network.

Figure 11:
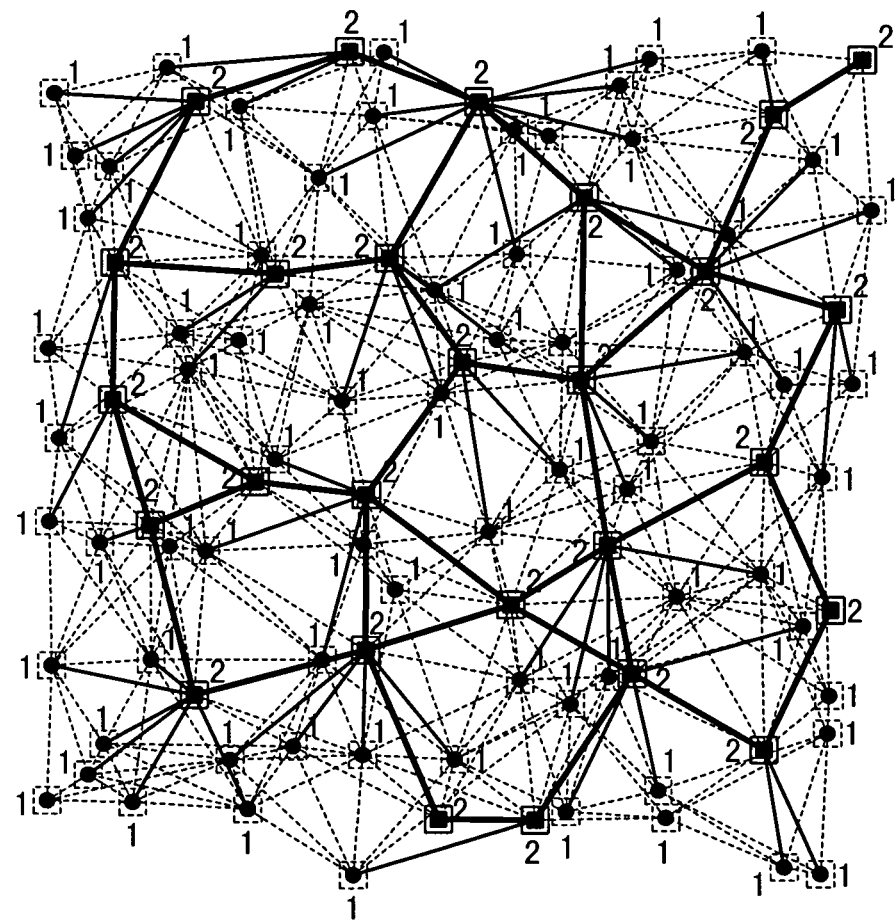
FIG. 11 shows an example of a network configuration in an actual operating environment.

FIG. 11 shows an exemplary network configuration with a larger number of wireless devices operating in a realistic network environment. The circles 1 represent slave nodes and the squares 2 represent master nodes. The lines connecting wireless devices represent available communication links, with bold lines representing links between master nodes, and dotted lines representing unused lines. There are enough master-to-master links to enable all the wireless devices in the network to communicate with each another.

Barring one of the occurrences described above, this network remains stable in the state shown in FIG. 11. Any conventional routing method, such as the Ad-hoc On-demand Distance Vector (AODV) method, can be used to route communications between an arbitrary pair of wireless devices in the network.

In some network configurations, transitions between the master and slave modes can occur frequently, requiring frequent routing processing to adjust to the changes. Addition of other routing functions, such as the following, can achieve more stable routing in such cases.

For example, any wireless device whose network configuration has changed, as indicated by the information in its mode information storage facility 301, may transmit routing information to all the other wireless devices in the network.

Alternatively, all wireless devices in the network may transmit their routing information periodically to keep the routing information about the entire network up to date.

The addition of such functions leads to more stable routing because each wireless device is promptly informed of changes at other wireless devices, enabling the network to reach a new stable configuration quickly.

FIG. 12 is a flowchart showing a procedure for transmitting the transition request signal in step S106 in FIG. 6.

In FIG. 12, the mode transition request signal transmission control unit 304 transmits a transition request signal if the wireless device including the mode transition request signal transmission control unit 304 is operating as a master node (step S401) and there are no neighboring slave nodes depending solely on the wireless device including the mode transition request signal transmission control unit 304.

Specifically, the mode transition request signal transmission control unit 304 refers to the information stored in the mode information storage facility 301 to determine whether all neighboring slave nodes are neighbors of another master node (step S402). If there is even one neighboring slave node that is not a neighbor of any other master node, the transition request signal is not transmitted (step S406). If all neighboring slave nodes are neighbors of another master node, the number of neighboring slave nodes is tested (step S403).

If there is just one neighboring slave node, a transition request signal is transmitted to that slave node (step S404).

If there are two or more neighboring slave nodes, a transition request signal is transmitted to the neighboring slave node that neighbors the largest number of master nodes (step S405). Since the destination of the transition request signal is a slave node, the transition request signal is transmitted immediately after a notification signal is received from the slave node.

Upon receiving the transition request signal, the slave node switches over to operate as a master node and transmits a notification signal to notify its neighboring wireless devices of this change.

The above embodiment provides the following advantages.

Relay processing is carried out by enough wireless devices to configure the network, but not by all the wireless devices in the network. Those wireless devices that do not perform relay processing spend much of their time in a sleep state, thereby reducing power consumption in the network as a whole.

The network configuration can be dynamically changed in response to environmental changes, such as obstruction of a communication link, and in response to changes in the wireless devices themselves, such as a falling battery charge level or a device failure, enabling the network to continue to function despite such events. As a result, a reliable network can be implemented.

The embodiment described above can be modified as follows.

In order to make the network more stable, a wireless device that is operating as a slave node may confirm that the states of its neighboring wireless devices remain unchanged before entering the sleep state.

Also in order to make the network more stable, reception stand-by control may be performed so that a wireless device that is operating as a slave node may occasionally remain in the reception stand-by state for a long enough time (e.g., the entire interval between two notification signal transmission periods) to receive notification signals from all neighboring wireless devices, update its information about neighboring wireless devices, and reconfirm that it does not need to perform relay duties.

It is also possible to apply sleep control at master nodes. In one scheme, a wireless device operating as a master node enters the sleep state on command from its power control unit 303 when the information received from the neighboring wireless devices remains unchanged for at least a predetermined period. In another scheme, the power control unit 303 places the wireless device in the sleep state if it does not transmit, receive, or relay any data during the periods scheduled for the transmission and reception of notification signals. These sleep periods end at, for example, the next notification signal transmission period.

It is also possible to have a wireless device operate as a master node at all times, regardless of the states of its neighboring wireless devices, depending on a property of the wireless device such as, for example, connection to a commercial power source or a high level of battery charge.

It is also possible to disable the relay function in a wireless device depending on a property of the wireless device, such as a low battery charge level, except in cases in which the network cannot function properly if the wireless device does not perform relay processing.

The criteria for maintaining the list of neighboring wireless devices may be modified so that a wireless device is added to the list if at least a specified number of notification signals are received from the wireless device in a predetermined period.

Those skilled in the art will recognize that further variations are possible within the scope of the invention, which is defined in the appended claims.

What is claimed is:

1. A wireless device for use in a wireless communication network including at least one or more neighboring wireless devices with which the wireless device communicates directly, the wireless device as well as each of said at least one or more neighboring wireless devices being operable as masters in a first mode and as slaves in a second mode, the wireless device relaying communications between the neighboring wireless devices in the first mode but not in the second mode, the wireless device comprising:
 a power controller for performing power control in the wireless device in different ways, depending on whether the wireless device operates as a master in the first mode or as a slave in the second mode;
 a transmitter controlled by the power controller to transmit mode information and data to the neighboring wireless devices, the transmitted mode information indicating whether the wireless device is operating as a master in the first mode or as a slave in the second mode;
 a receiver controlled by the power controller to receive mode information and data from each of the neighboring wireless devices, the received mode information indicating whether each of the neighboring wireless devices is operating as a master in the first mode or as a slave in the second mode;
 a storage facility for storing the received mode information;
 a mode controller for deciding whether to have the wireless device operate as a master in the first mode or as a slave in the second mode, depending at least on the presence of a neighboring wireless device operating in the first mode and in response to environmental changes of a communication link, as indicated by the received mode information that the neighboring wireless device is operating as a master in the first mode or as a slave in the second node; and
 a transition request signal transmitter for, when the wireless device is operating as a master in the first mode and the received mode information indicates that all the neighboring wireless devices operating as slaves in the second mode are able to communicate directly with at least one other wireless device, operating as a master in the first mode, transmitting a transition request signal to one of the neighboring wireless devices operating as slaves in the second mode to direct the one of the neighboring wireless devices to operate as a master in the first mode.

2. The wireless device of claim 1, wherein based on the mode information, the mode controller has the wireless device operate as a master in the first mode when no neighboring device is operating as a master in the first mode.

3. The wireless device of claim 2, wherein the received mode information also indicates the ability of the neighboring wireless devices to communicate with each other, and the mode controller has the wireless device operate as a slave in the second mode when the received mode information indicates that operating as a slave in the second mode does not prevent the neighboring wireless devices from communicating with each other and that at least one of the neighboring wireless devices is operating in the first mode.

4. The wireless device of claim 3, wherein the received mode information includes two-hop information listing wireless devices with which the neighboring wireless devices can communicate directly and indicating whether the listed wireless devices are operating as a master in the first mode or as a slave in the second mode.

5. The wireless device of claim 4, wherein the mode controller has the wireless device operate as a master in the first mode when the received mode information indicates that some neighboring wireless device operating as a slave in the second mode cannot communicate directly with any other wireless device operating as a master in the first mode.

6. The wireless device of claim 4, wherein the mode controller has the wireless device operate as a slave in the second mode when the received mode information indicates that only one neighboring wireless device is operating as a master in the first mode and all neighboring wireless devices operating as slaves in the second mode can communicate directly with at least one other wireless device, operating as a master in the first mode.

7. The wireless device of claim 4, wherein the mode controller has the wireless device operate as a master in the first mode when the received mode information indicates that at least two neighboring wireless devices are operating as masters in the first mode and the received mode information does not indicate that all the neighboring wireless devices operating as masters in the first mode can communicate with each other without having communications relayed by the wireless device itself.

8. The wireless device of claim 4, wherein the mode controller has the wireless device operate as a slave in the second mode when the received mode information indicates that at least two neighboring wireless devices are operating as masters in the first mode, that all the neighboring wireless devices operating as masters in the first mode can communicate with each other without having communications relayed by the wireless device itself, and that all neighboring wireless devices operating as slaves in the second mode can communicate directly with at least one other wireless device operating as a master in the first mode.

9. The wireless device of claim 1, wherein the transition request signal transmitter selects a neighboring wireless device able to communicate directly with a largest number of wireless devices operating as masters in the first mode and transmits the transition request signal to the selected neighboring wireless device.

10. The wireless device of claim 1, wherein the receiver also receives transition request signals from the neighboring wireless devices and the mode controller has the wireless device operate as a master in the first mode when a transition request signal is received.

11. The wireless device of claim 1, wherein when the wireless device is operating as a master in the first mode, the power controller powers the transmitter to transmit the mode information at regular intervals, powers the transmitter as necessary to transmit the data, and powers the receiver to stand by to receive whenever the transmitter is not transmitting.

12. The wireless device of claim 11, wherein, when the wireless device is operating as a master in the first mode, the power controller periodically places the wireless device in a sleep state if no communication with any of the neighboring wireless devices takes place for a predetermined time.

13. The wireless device of claim 11, wherein, when the wireless device is operating as a master in the first mode, the power controller periodically places the wireless device in a sleep state if the mode information and data received by the receiver remain unchanged for a predetermined time.

14. The wireless device of claim 1, wherein when the wireless device is operating as a slave in the second mode, the power controller powers the transmitter to transmit the mode information and data during scheduled transmission periods, powers the receiver to stand by to receive during scheduled reception periods, and places the wireless device in a sleep state during times other than the scheduled transmission periods and the scheduled reception periods.

15. The wireless device of claim 14, wherein the scheduled reception periods immediately follow the scheduled transmission periods.

16. A wireless system comprising wireless devices, each of the wireless devices is for use in a wireless communication network including at least one or more neighboring wireless devices with which the wireless device communicates directly, the wireless device as well as each of said at least one or more neighboring devices being operable as masters in a first mode and as slaves in a second mode, the wireless device relaying communications between the neighboring wireless devices in the first mode but not in the second mode, the wireless device comprising:
   a power controller for performing power control in the wireless device in different ways, depending on whether the wireless device operates as a master in the first mode or as a slave in the second mode;
   a transmitter controlled by the power controller to transmit mode information and data to the neighboring wireless devices, the transmitted mode information indicating whether the wireless device is operating as a master in the first mode or as a slave in the second mode;
   a receiver controlled by the power controller to receive mode information and data from each of the neighboring wireless devices, the received mode information indicating whether each of the neighboring wireless devices is ace operating as a master in the first mode or as a slave in the second mode;
   a storage facility for storing the received mode information;
   a mode controller for deciding whether to have the wireless device operate as a master in the first mode or as a slave in the second mode, depending at least on the presence of a neighboring wireless device operating in the first mode and in response to environmental changes of a communication link, as indicated by the received mode information that the neighboring wireless device is operating as a master in the first mode or as a slave in the second node; and
   a transition request signal transmitter for, when the wireless device is operating as a master in the first mode and the received mode information indicates that all the neighboring wireless devices operating as slaves in the second mode are able to communicate directly with at least one other wireless device operating as a master in the first mode, transmitting a transition request signal to one of the neighboring wireless devices operating as slaves in the second mode to direct the one of the neighboring wireless devices to operate as a master in the first mode.

* * * * *